(12) United States Patent
Yan et al.

(10) Patent No.: US 11,236,633 B2
(45) Date of Patent: Feb. 1, 2022

(54) SOLAR AIDED COAL-FIRED POWER GENERATION SYSTEM PARTICIPATING IN PRIMARY FREQUENCY REGULATION AND CONTROL METHOD THEREOF

(71) Applicant: XI'AN JIAOTONG UNIVERSITY, Shaanxi (CN)

(72) Inventors: Junjie Yan, Shaanxi (CN); Yongliang Zhao, Shaanxi (CN); Ming Liu, Shaanxi (CN); Daotong Chong, Shaanxi (CN)

(73) Assignee: XI'AN JIAOTONG UNIVERSITY, Shaanxi (CN)

( * ) Notice: Subject to any disclaimer, the term of this patent is extended or adjusted under 35 U.S.C. 154(b) by 0 days.

(21) Appl. No.: 17/279,569

(22) PCT Filed: Jun. 22, 2019

(86) PCT No.: PCT/CN2019/092432
§ 371 (c)(1),
(2) Date: Mar. 24, 2021

(87) PCT Pub. No.: WO2020/181680
PCT Pub. Date: Sep. 17, 2020

(65) Prior Publication Data
US 2021/0310365 A1    Oct. 7, 2021

(30) Foreign Application Priority Data

Mar. 13, 2019  (CN) .......................... 201910189573.6

(51) Int. Cl.
*F01D 15/10*    (2006.01)
*F01K 7/38*    (2006.01)
(Continued)

(52) U.S. Cl.
CPC ................ *F01D 15/10* (2013.01); *F01K 7/38* (2013.01); *F03G 6/003* (2013.01); *F03G 6/065* (2013.01);
(Continued)

(58) Field of Classification Search
CPC .......... F01D 15/10; F03G 6/003; F03G 6/065; F22D 1/18; F22D 11/06; F22D 5/34;
(Continued)

(56) References Cited

U.S. PATENT DOCUMENTS

| 4,069,674 A * | 1/1978 | Warren ...................... F01K 7/40 60/641.8 |
| 7,640,746 B2 * | 1/2010 | Skowronski ............ F03G 6/005 60/641.8 |

(Continued)

FOREIGN PATENT DOCUMENTS

CN    102454440    5/2012

OTHER PUBLICATIONS

Tang, Keyi. Optimization of no-load strategy for primary frequency modulation of large units. China Master's Theses Full-text Database, Engineering Technology II, Mar. 2017, pp. 5-14, 52 and 53.

*Primary Examiner* — Hoang M Nguyen

(57) ABSTRACT

A solar aided coal-fired power generation system participating in primary frequency regulation and a control method thereof propose a system configuration with two regulation schemes by coupling medium-low-temperature solar collectors and a coal-fired generation unit. The two regulation schemes are a high-pressure feedwater bypass scheme and a low-pressure condensate bypass scheme. The present invention formulates a primary frequency regulation control logic, so as to efficiently and accurately participate in the primary frequency regulation, thereby keeping the power grid frequency rapidly stable. The present invention also formulates (Continued)

a working fluid outlet temperature control logic for the solar aided coal-fired thermal system, which adjusts a heat exchange working fluid flow of the solar collectors to ensure that the temperature in each section is stable during the primary frequency regulation. The present invention uses operation matching of the turbine system and the solar collectors to improve effectiveness of the primary frequency regulation.

3 Claims, 3 Drawing Sheets

(51) Int. Cl.
| | |
|---|---|
| *F22D 1/18* | (2006.01) |
| *F22D 5/34* | (2006.01) |
| *F24S 20/20* | (2018.01) |
| *F22D 1/50* | (2006.01) |
| *H02J 3/38* | (2006.01) |
| *F22D 11/06* | (2006.01) |
| *F03G 6/00* | (2006.01) |
| *F03G 6/06* | (2006.01) |

(52) U.S. Cl.
CPC ............... *F22D 1/18* (2013.01); *F22D 1/50* (2013.01); *F22D 5/34* (2013.01); *F22D 11/06* (2013.01); *F24S 20/20* (2018.05); *H02J 3/38* (2013.01); *H02J 2300/22* (2020.01)

(58) Field of Classification Search
CPC . F22D 1/50; H02J 3/38; H02J 2300/22; F24S 20/20; F01K 7/38
USPC ........... 60/641.8–641.15, 653, 654, 677–680
See application file for complete search history.

(56) References Cited

U.S. PATENT DOCUMENTS

| | | | |
|---|---|---|---|
| 9,745,964 B2* | 8/2017 | Ungerer | .................... F03G 6/06 |
| 2013/0019599 A1* | 1/2013 | Birnbaum | ............... F03G 6/067 |
| | | | 60/641.15 |
| 2015/0337811 A1* | 11/2015 | Chen | .................... F24S 10/754 |
| | | | 60/641.5 |

* cited by examiner

SOLAR AIDED COAL-FIRED POWER GENERATION SYSTEM PARTICIPATING IN PRIMARY FREQUENCY REGULATION AND CONTROL METHOD THEREOF

BACKGROUND OF THE PRESENT INVENTION

Field of Invention

The present invention relates to a technical field of thermal power control for thermal power plants, and more particularly to a solar aided coal-fired power generation system participating in primary frequency regulation and a control method thereof.

Description of Related Arts

As the problems of energy shortage, environmental pollution and climate change become increasingly prominent, the proportion of renewable energy in various countries is increasing year by year. However, the renewable energy is generally intermittent and fluctuating, and is susceptible to environmental conditions, which threatening the safety and stability of the power system. Therefore, the flexibility of the power grid needs to be improved. The short-term power grid regulation is mainly primary frequency regulation, which adjusts the load frequently changing in a small range, thereby quickly adjusting the output power of the generator unit when the power grid is out of order to suppress the further deterioration of the power grid frequency. Coal-fired power units have the advantages such as large capacity, controllable power, and no geographical restrictions, and have been widely involved in the adjustment of the operational flexibility of the power grid. High-pressure extraction and low-pressure extraction of conventional adjustment methods can make full use of the heat storage on the steam turbine side to quickly adjust the frequency, but they also result in a serious shortage of heater outlet temperature, leading to a significant reduction in the efficiency and safety of the deaerator and the boiler. Restricted by the heat collection temperature, the efficiency of simple trough solar thermal power generation is very low. Furthermore, there are disadvantages such as unstable energy input, large landing area, and high investment cost. However, the combination of solar heat collection technology and fossil fuels for complementary power generation is an effective way to improve efficiency and lower cost of the single solar thermal power generation. In the near and mid-term development stages of solar thermal power generation technology of China, solar aided power generation is an effective way to promote energy saving and emission reduction, as well as to develop large-scale solar thermal utilization technology. In a solar aided power generation system, different solar collectors have different operating temperature ranges to heat water or steam at different locations. Therefore, making full use of the respective advantages of coal-fired power units and solar heat collection technology can provide strategic and data guidance for the primary frequency control of the coal-fired power units, thereby fundamentally improving the transient process flexibility of the solar aided coal-fired power units.

SUMMARY OF THE PRESENT INVENTION

The present invention aims to solve the problem that economy of a generation unit will be inevitably sacrificed when a transient process of a simple coal-fired power unit uses a thermal system adjustment method to participate in primary frequency regulation, which causes the thermal system to deviate from an economic operation state. The present invention can make full use of heat storage characteristics of different devices in a steam turbine system and a solar collector to select a suitable method to participate in the primary frequency regulation through parameter and operation matching, thereby quickly and effectively ensuring stability of power grid frequencies.

Accordingly, in order to accomplish the above objects, the present invention provides:

a solar aided coal-fired power generation system participating in primary frequency regulation, comprising: a boiler (1), a steam turbine (2) connected to an outlet of the boiler (1), a high-pressure heater (3) connected to a high-pressure cylinder extraction port of the steam turbine (2), a deaerator (4) connected to a medium-pressure cylinder extraction port of the steam turbine (2), a low-pressure heater (5) connected to a low-pressure cylinder extraction port of the steam turbine (2), and a condenser (6) connected to a low-pressure cylinder exhaust port of the steam turbine (2); the solar aided coal-fired power generation system further comprises a high-pressure feedwater bypass regulation system and a low-pressure condensate bypass regulation system to enable two primary frequency regulation schemes consisting of a high-pressure feedwater bypass regulation scheme and a low-pressure condensate bypass regulation scheme:

1) in the high-pressure feedwater bypass regulation scheme, feedwater at an outlet of the deaerator (4) is boosted by a feedwater pump (8) and divided into two paths, wherein one path passes through the high-pressure heater (3) and a feedwater valve (7) before entering the boiler (1), and the other path passes through a feedwater bypass valve (11) before entering a high-pressure bypass heat exchanger (12) to merge into the boiler (1); meanwhile, a heat exchange working fluid of the high-pressure bypass heat exchanger (12) is boosted by a high-pressure bypass pump (13) before entering a first solar collector (14) to absorb solar energy collected, and then enters the high-pressure bypass heat exchanger (12) to transfer heat to the feedwater; during the primary frequency regulation, output power of the steam turbine (2) is rapidly changed by adjusting the feedwater bypass valve (11), thereby meeting requirements of the primary frequency regulation;

2) in the low-pressure condensate bypass regulation scheme, condensate at an outlet of the condenser (6) is boosted by a condensate pump (10) and divided into two paths, wherein one path passes through the low-pressure heater (5) and a deaerator inlet valve (9) before entering the deaerator (4), and the other path passes through a condensate bypass valve (15) before entering a low-pressure bypass heat exchanger (16) to merge into the deaerator (4); meanwhile, a heat exchange working fluid of the low-pressure bypass heat exchanger (16) is boosted by a low-pressure bypass pump (17) before entering a second solar collector (18) to absorb the solar energy collected, and then enters the low-pressure bypass heat exchanger (16) to transfer heat to the condensate; during the primary frequency regulation, the output power of the steam turbine (2) is rapidly changed by adjusting the condensate bypass valve (15), thereby meeting requirements of the primary frequency regulation.

Preferably, the feedwater bypass valve (11) and the condensate bypass valve (15) are both steam-actuated regulating valves; in the high-pressure feedwater bypass regulation system, the first solar collector (14) is a medium temperature trough solar collector, and a heat-conducting working fluid is Therminol®; in the low-pressure condensate bypass regulation system, the second solar collector (18) is a medium-low temperature flat plate solar collector, and a heat-conducting working fluid is Therminol® or water.

The present also provides a method for controlling the solar aided coal-fired power generation system participating in primary frequency regulation, comprising formulating a primary frequency regulation control logic and a heater outlet temperature control logic according to operating characteristics of the solar aided coal-fired power generation system, which comprises specific steps of:

1) formulating the primary frequency regulation control logic:

according to an operating status of a power grid, obtaining a maximum frequency adjustment $\Delta f_{max}$ when the primary frequency regulation is needed, and then converting into a required maximum power adjustment $\Delta P_{max}$ with a speed droop $\delta$ of a generation unit, which is:

$$\Delta P_{max} = f_1(\Delta f_{max}) = \Delta f_{max}/\delta$$

according to an actual operating status of the solar aided coal-fired power generation system, determining a maximum power adjustment $\Delta P_{LPH,max}$ of the low-pressure condensate bypass regulation scheme, and comparing with the required maximum power adjustment $\Delta P_{max}$, wherein if $\Delta P_{max} > \Delta P_{LPH,max}$, the high-pressure feedwater bypass regulation scheme is selected for the primary frequency regulation; if $\Delta P_{max} \leq \Delta P_{LPH,max}$, the low-pressure condensate bypass regulation scheme is selected for the primary frequency regulation;

after determining a regulation scheme for the primary frequency regulation, obtaining a real-time frequency value $f_{pv}$ according to the operating state of the power grid, and comparing with a stable frequency value $f_{sp}$ required by the power grid, so as to calculate a frequency deviation $\Delta f$; setting parameters of the frequency deviation in a speed governor to obtain a power adjustment $\Delta P$, wherein the parameters comprise a frequency modulation deadband and a speed droop:

$$\Delta P = f_2(\Delta f)$$

superimposing an adjustment output $\Delta \mu$, which is obtained by the power adjustment $\Delta P$ in a PID controller, on a control valve corresponding to the high-pressure feedwater bypass regulation scheme or the low-pressure condensate bypass regulation scheme, so as to generate a latest valve opening $\mu_{new}$:

$$\mu_{new} = \mu_{old} + \Delta \mu$$

wherein $\mu_{old}$ is an initial valve opening;

finally, applying an optimal scheme to the primary frequency regulation to form a closed-loop optimization control logic; and 2) formulating an outlet water temperature control logic for the high-pressure heater and the low-pressure heater:

for the primary frequency regulation with the high-pressure feedwater bypass regulation scheme, formulating the outlet water temperature control logic as: first, using a temperature sensor to obtain a temperature $T_{f,pv}$ when the feedwater enters the boiler (1), and comparing the temperature $T_{f,pv}$ with a preset temperature $T_{f,sp}$ for the feedwater to enter the boiler (1), so as to obtain a temperature deviation $\Delta T_1$; using the temperature sensor to obtain a temperature $T_{s,pv}$ when a working fluid of the first solar collector (14) enters the high-pressure bypass heat exchanger (12), and comparing the temperature $T_{s,pv}$ with a preset temperature $T_{s,sp}$ for the working fluid of the first solar collector (14) to enter the high-pressure bypass heat exchanger (12), so as to obtain a temperature deviation $\Delta T_2$; accumulating the two temperature deviations to obtain a total temperature deviation $\Delta T_h$:

$$\Delta T_h = \Delta T_1 + \Delta T_2;$$

calculating the total temperature deviation $\Delta T_h$ in the PID controller to obtain a direct control command $\Delta \Psi_h$ for the high-pressure bypass pump (13):

$$\Delta \Psi_h = f(\Delta T_h);$$

meanwhile, due to long solar collector piping and large thermal inertia, processing a primary frequency regulation fast command with feedforward correction for temperature control of each section; and using a control command $\Delta \mu_h$ for the feedwater bypass valve (11), which is obtained in the primary frequency regulation control logic of the high-pressure feedwater bypass regulation scheme, to generate a feedforward signal command $\Delta \varphi_h$ for the high-pressure bypass pump (13) through a function generator:

$$\Delta \varphi_h = f(\Delta \mu_h)$$

finally, superimposing the direct control command $\Delta \Psi_h$ and the feedforward signal command $\Delta \varphi_h$ on the high-pressure bypass pump (13) to generate a latest speed command $\sigma_{h,new}$ thereof:

$$\sigma_{h,new} = \sigma_{h,old} + \Delta \Psi_h + \Delta \varphi_h$$

wherein: $\sigma_{h,old}$ is an initial speed of the high-pressure bypass pump (13);

for the primary frequency regulation with the low-pressure condensate bypass regulation scheme, formulating the outlet water temperature control logic as: first, using the temperature sensor to obtain a temperature $T_{c,pv}$ when the condensate enters the deaerator (4), and comparing the temperature $T_{c,pv}$ with a preset temperature $T_{c,sp}$ for the condensate to enter the deaerator (4), so as to obtain a temperature deviation $\Delta T_3$; using the temperature sensor to obtain a temperature $T_{o,pv}$ when a working fluid of the second solar collector (18) enters the low-pressure bypass heat exchanger (16), and comparing the temperature $T_{o,pv}$ with a preset temperature $T_{o,sp}$ for the working fluid of the second solar collector (18) to enter the low-pressure bypass heat exchanger (16), so as to obtain a temperature deviation $\Delta T_4$; accumulating the two temperature deviations to obtain a total temperature deviation $\Delta T_d$:

$$\Delta T_d = \Delta T_3 + \Delta T_4;$$

calculating the total temperature deviation $\Delta T_d$ in the PID controller to obtain a direct control command $\Delta \Psi_d$ for the low-pressure bypass pump (17):

$$\Delta \Psi_d = f(\Delta T_d);$$

meanwhile, due to long solar collector piping and large thermal inertia, processing a primary frequency regulation fast command with feedforward correction for temperature control of each section; and using a control command $\Delta \mu_d$ for the condensate bypass valve (15), which is obtained in the primary frequency regulation control logic of the low-pressure condensate bypass regulation scheme, to generate a feedforward signal command $\Delta \varphi_d$ for the low-pressure bypass pump (17) through the function generator:

$$\Delta \varphi_d = f(\Delta \mu_d)$$

finally, superimposing the direct control command $\Delta \Psi_d$ and the feedforward signal command $\Delta \varphi_d$ on the low-pressure bypass pump (17) to generate a latest speed command $\sigma_{d,new}$ thereof:

$$\sigma_{d,new} = \sigma_{d,old} + \Delta \Psi_d + \Delta \varphi_d$$

wherein: $\sigma_{d,old}$ is an initial speed of the low-pressure bypass pump (17).

Preferably, the high-pressure bypass pump (13) in the high-pressure feedwater bypass regulation system and the low-pressure bypass pump (17) in the low-pressure condensate bypass regulation system are both variable-speed pumps for controlling the temperatures when the feedwater enters the boiler (1) and the condensate enters the deaerator (4) in real time, thereby ensuring a minimal deviation between the temperature when the feedwater enters the boiler (1) and the preset temperature, as well as a minimal deviation between the temperature when the condensate enters the deaerator (4) and the preset temperature.

Compared with the prior art, the present invention has the following advantages:

1. The present invention makes full use of the heat storage in the steam turbine and the solar collector pipes, and participates in the primary frequency regulation through configuration adjustment of the thermal system, thereby meeting the requirements of rapid power response. The present invention also uses large inertia and temperature control of the solar collector to ensure the heater outlet temperature and reduce irreversible destruction, so as to achieve a higher efficiency while greatly improving operational flexibility of the coal-fired generator unit in the transient processes.

2. The present invention can realize automatic control, which is simple and easy to operate, and requires low investment.

BRIEF DESCRIPTION OF THE DRAWINGS

FIG. 3 illustrates a temperature control logic when the solar aided coal-fired power generation system participates in the primary frequency regulation, wherein FIG. 3(a) illustrates a temperature control logic in a high-pressure feedwater bypass regulation scheme; and FIG. 3(b) illustrates a temperature control logic in a low-pressure condensate bypass regulation scheme.

DETAILED DESCRIPTION OF THE PREFERRED EMBODIMENT

Figure 1:
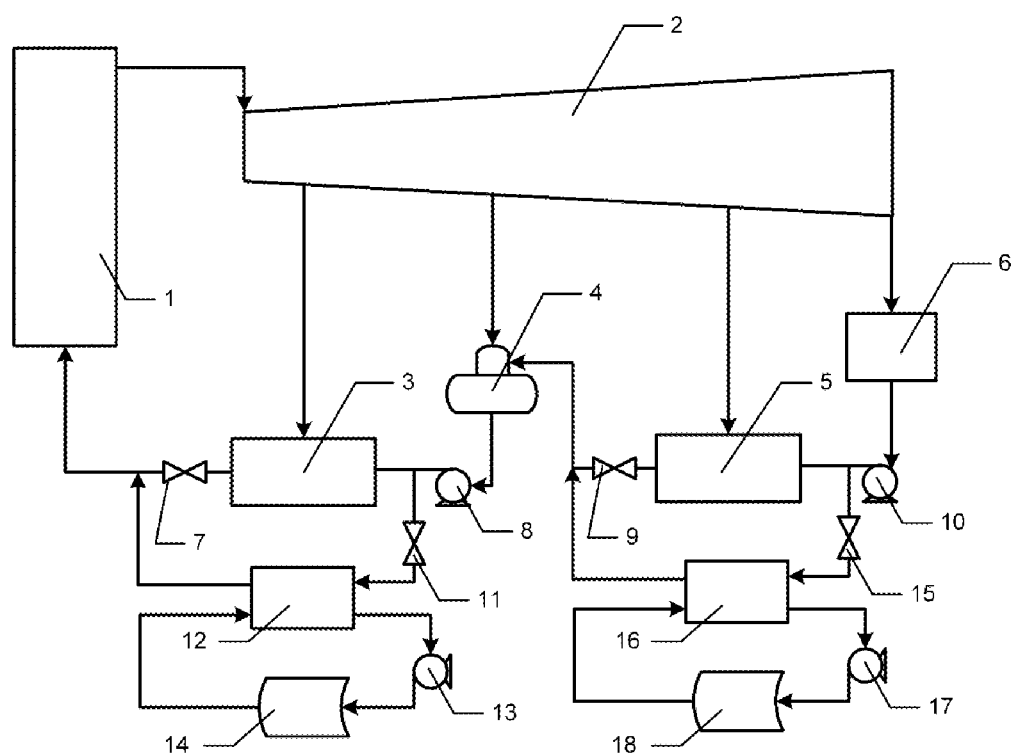
FIG. 1 is a configuration of a solar aided coal-fired power generation system participating in primary frequency regulation.

Referring to the drawings, the present invention will be further illustrated.

Referring to FIG. 1, a solar aided coal-fired power generation system participating in primary frequency regulation is illustrated, comprising: a boiler 1, a steam turbine 2 connected to an outlet of the boiler 1, a high-pressure heater 3 connected to a high-pressure cylinder extraction port of the steam turbine 2, a deaerator 4 connected to a medium-pressure cylinder extraction port of the steam turbine 2, a low-pressure heater 5 connected to a low-pressure cylinder extraction port of the steam turbine 2, and a condenser 6 connected to a low-pressure cylinder exhaust port of the steam turbine 2; the solar aided coal-fired power generation system further comprises a high-pressure feedwater bypass regulation system and a low-pressure condensate bypass regulation system to enable two primary frequency regulation schemes consisting of a high-pressure feedwater bypass regulation scheme and a low-pressure condensate bypass regulation scheme:

1) in the high-pressure feedwater bypass regulation scheme, feedwater at an outlet of the deaerator 4 is boosted by a feedwater pump 8 and divided into two paths, wherein one path passes through the high-pressure heater 3 and a feedwater valve 7 before entering the boiler 1, and the other path passes through a feedwater bypass valve 11 before entering a high-pressure bypass heat exchanger 12 to merge into the boiler 1; meanwhile, a heat exchange working fluid of the high-pressure bypass heat exchanger 12 is boosted by a high-pressure bypass pump 13 before entering a first solar collector 14 to absorb solar energy collected, and then enters the high-pressure bypass heat exchanger 12 to transfer heat to the feedwater; during the primary frequency regulation, output power of the steam turbine 2 is rapidly changed by adjusting the feedwater bypass valve 11, thereby meeting requirements of the primary frequency regulation;

2) in the low-pressure condensate bypass regulation scheme, condensate at an outlet of the condenser 6 is boosted by a condensate pump 10 and divided into two paths, wherein one path passes through the low-pressure heater 5 and a deaerator inlet valve 9 before entering the deaerator 4, and the other path passes through a condensate bypass valve 15 before entering a low-pressure bypass heat exchanger 16 to merge into the deaerator 4; meanwhile, a heat exchange working fluid of the low-pressure bypass heat exchanger 16 is boosted by a low-pressure bypass pump 17 before entering a second solar collector 18 to absorb the solar energy collected, and then enters the low-pressure bypass heat exchanger 16 to transfer heat to the condensate; during the primary frequency regulation, the output power of the steam turbine 2 is rapidly changed by adjusting the condensate bypass valve 15, thereby meeting requirements of the primary frequency regulation.

Figure 2:
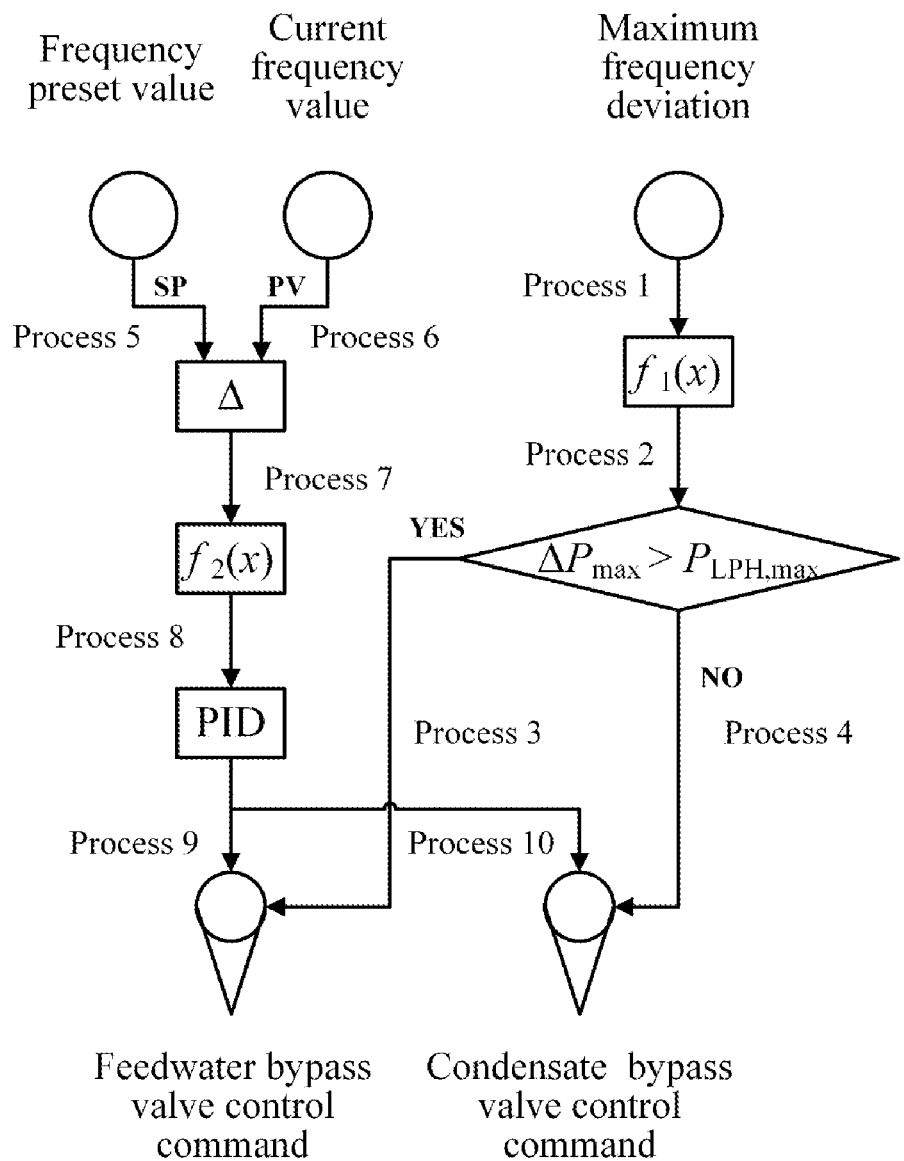
FIG. 2 illustrates a primary frequency regulation control logic of the solar aided coal-fired power generation system.

FIG. 2 illustrates a primary frequency regulation control logic of the solar aided coal-fired power generation system, wherein process 1: determining a current maximum frequency deviation according to a primary frequency regulation command of a power grid, and transmitting it to a processing unit $f_1(x)$; process 2: transmitting a required maximum power adjustment, which is obtained by the processing unit $f_1(x)$, to a comparator; process 3: judging according to conditions in the comparator, if the condition are satisfied, selecting the high-pressure feedwater bypass regulation scheme to participate in the primary frequency regulation; process 4: judging according to the conditions in the comparator, if the conditions are not satisfied, selecting the low-pressure condensate bypass regulation scheme to participate in the primary frequency regulation; process 5: sending a power grid frequency preset value to a deviation calculator; process 6: measuring a current frequency value, and transmitting a processed signal to the deviation calculator; process 7: transmitting a power grid frequency deviation signal to a speed governor; process 8: transforming a frequency signal into a power adjustment signal in the speed governor, including parameter settings such as frequency modulation deadband and speed droop, and sending a signal to a PID controller; process 9: converting an input deviation signal into a valve command by the PID controller, and sending it to a feedwater bypass valve execution unit; and process 10: converting the input deviation signal into the valve command by the PID controller, and sending it to the condensate bypass valve execution unit.

Figure 3:
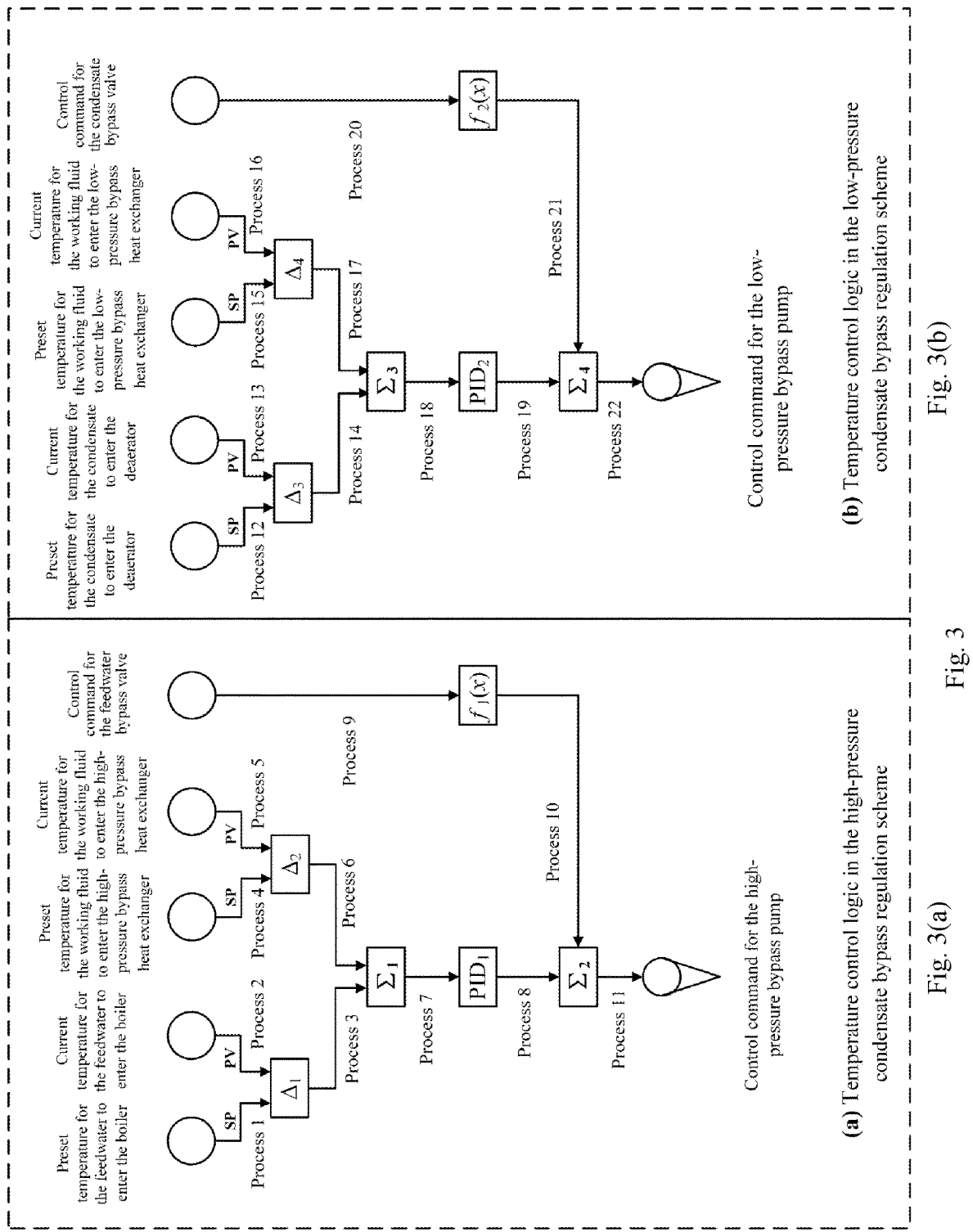

FIG. 3(a) illustrates a temperature control logic when the solar aided coal-fired power generation system uses the high-pressure feedwater bypass regulation scheme to participate in the primary frequency regulation, wherein process 1: sending a preset temperature for the feedwater to enter the boiler 1 to a deviation device Δ1; process 2: sending a measured current temperature when the feedwater enters the boiler 1 to the deviation device Δ1; process 3: generating a feedwater deviation signal, and transmitting it to an accumulator Σ1; process 4: sending preset temperature for the working fluid to enter the high-pressure bypass heat exchanger 12 to a deviation Δ2; process 5: sending a measured current temperature when the working fluid enters the high-pressure bypass heat exchanger 12 to the deviation Δ2; process 6: generating a heat-conducting oil deviation signal and transmitting it to the accumulator Σ1; process 7: sending an accumulated deviation to the PID controller 1; process 8: in the PID controller, converting the input deviation signal into an adjustment signal of the high-pressure bypass pump 13, and sending it to an accumulator Σ2; process 9: transmitting a control command for the feedwater bypass valve 11 which participates in the primary frequency regulation to the processing unit $f_1(x)$; process 10: in the $f_1(x)$, converting a valve control command into a feedforward control command of the high-pressure bypass pump 13, and sending to the accumulator Σ2; and process 11: sending a final control command for the high-pressure bypass pump 13, which is generated by the accumulator Σ2, to the high-pressure bypass pump 13, so as to control a speed of the high-pressure bypass pump 13.

FIG. 3(b) illustrates a temperature control logic when the solar aided coal-fired power generation system uses the low-pressure condensate bypass regulation scheme to participate in the primary frequency regulation, wherein process 12: sending a preset temperature for the condensate to enter the deaerator 4 to a deviation device Δ3; process 13: sending a measured current temperature when the condensate enters the deaerator 4 to the deviation device Δ3; process 14: generating a condensate deviation signal, and transmitting it to an accumulator Σ3; process 15: sending preset temperature for the working fluid to enter the low-pressure bypass heat exchanger 16 to a deviation Δ4; process 16: sending a measured current temperature when the working fluid enters the low-pressure bypass heat exchanger 16 to the deviation Δ4; process 17: generating a heat-conducting working fluid deviation signal and transmitting it to the accumulator Σ3; process 18: sending an accumulated deviation to the PID controller 2; process 19: in the PID controller, converting the input deviation signal into an adjustment signal of the low-pressure bypass pump 17, and sending it to an accumulator Σ4; process 20: transmitting a control command for the condensate bypass valve 15 which participates in the primary frequency regulation to a processing unit $f_2(x)$; process 21: in the $f_2(x)$, converting a valve control command into a feedforward control command of the low-pressure bypass pump 17, and sending to the accumulator Σ2; and process 22: sending a final control command for the low-pressure bypass pump 17, which is generated by the accumulator Σ4, to the low-pressure bypass pump 17, so as to control a speed of the low-pressure bypass pump 17.

What is claimed is:

1. A solar aided coal-fired power generation system participating in primary frequency regulation, comprising: a boiler (1), a steam turbine (2) connected to an outlet of the boiler (1), a high-pressure heater (3) connected to a high-pressure cylinder extraction port of the steam turbine (2), a deaerator (4) connected to a medium-pressure cylinder extraction port of the steam turbine (2), a low-pressure heater (5) connected to a low-pressure cylinder extraction port of the steam turbine (2), and a condenser (6) connected to a low-pressure cylinder exhaust port of the steam turbine (2); the solar aided coal-fired power generation system further comprises a high-pressure feedwater bypass regulation system and a low-pressure condensate bypass regulation system to enable two primary frequency regulation schemes consisting of a high-pressure feedwater bypass regulation scheme and a low-pressure condensate bypass regulation scheme:

1) in the scheme, feedwater at an outlet of the deaerator (4) is boosted by a feedwater pump (8) and divided into two paths, wherein one path passes through the high-pressure heater (3) and a feedwater valve (7) before entering the boiler (1), and the other path passes through a feedwater bypass valve (11) before entering a high-pressure bypass heat exchanger (12) to merge into the boiler (1); meanwhile, a heat exchange working fluid of the high-pressure bypass heat exchanger (12) is boosted by a high-pressure bypass pump (13) before entering a first solar collector (14) to absorb solar energy collected, and then enters the high-pressure bypass heat exchanger (12) to transfer heat to the feedwater; during the primary frequency regulation process, output power of the steam turbine (2) is rapidly changed by adjusting the feedwater bypass valve (11), thereby meeting requirements of the primary frequency regulation;

2) in the low-pressure condensate bypass regulation scheme, condensate at an outlet of the condenser (6) is boosted by a condensate pump (10) and divided into two paths, wherein one path passes through the low-pressure heater (5) and a deaerator inlet valve (9) before entering the deaerator (4), and the other path passes through a condensate bypass valve (15) before entering a low-pressure bypass heat exchanger (16) to merge into the deaerator (4); meanwhile, a heat exchange working fluid of the low-pressure bypass heat exchanger (16) is boosted by a low-pressure bypass pump (17) before entering a second solar collector (18) to absorb the solar energy collected, and then enters the low-pressure bypass heat exchanger (16) to transfer heat to the condensate; during the primary frequency regulation process, the output power of the steam turbine (2) is rapidly changed by adjusting the condensate bypass valve (15), thereby meeting requirements of the primary frequency regulation;

wherein a method for controlling the solar aided coal-fired power generation system participating in primary frequency regulation comprises formulating a primary frequency regulation control logic and a heater outlet temperature control logic according to operating characteristics of the solar aided coal-fired power generation system, which comprises specific steps of:

1) formulating the primary frequency regulation control logic:

according to an operating status of a power grid, obtaining a maximum frequency adjustment $\Delta f_{max}$ when the primary frequency regulation is needed, and then converting into a required maximum power adjustment $\Delta P_{max}$ with a speed droop δ of a generation unit, which is:

$$\Delta P_{max} = f_1(\Delta f_{max}) = \Delta f_{max}/\delta$$

according to an actual operating status of the solar aided coal-fired power generation system, determining a maximum power adjustment $\Delta P_{LPH,max}$ of the low-pressure condensate bypass regulation scheme, and comparing with the required maximum power adjustment $\Delta P_{max}$, wherein if $\Delta P_{max} > \Delta P_{LPH,max}$, the high-pressure feedwater bypass regulation scheme is selected for the primary frequency regulation; if $\Delta P_{max} \leq \Delta P_{LPH,max}$, the low-pressure condensate bypass regulation scheme is selected for the primary frequency regulation;

after determining a regulation scheme for the primary frequency regulation, obtaining a real-time frequency value $f_{pv}$ according to the operating state of the power grid, and comparing with a stable frequency value $f_{sp}$ required by the power grid, so as to calculate a frequency deviation $\Delta f$; setting parameters of the frequency deviation in a speed governor to obtain a power adjustment $\Delta P$, wherein the parameters comprise a frequency modulation deadband and a speed droop:

$$\Delta P = f_2(\Delta f)$$

superimposing an adjustment output $\Delta \mu$, which is obtained by the power adjustment $\Delta P$ in a PID controller, on a control valve corresponding to the high-pressure feedwater bypass regulation scheme or the low-pressure condensate bypass regulation scheme, so as to generate a latest valve opening $\mu_{new}$:

$$\mu_{new} = \mu_{old} + \Delta \mu$$

wherein $\mu_{old}$ is an initial valve opening;

finally, applying an optimal scheme to the primary frequency regulation to form a closed-loop optimization control logic; and 2) formulating an outlet water temperature control logic for the high-pressure heater and the low-pressure heater:

for the primary frequency regulation with the high-pressure feedwater bypass regulation scheme, formulating the outlet water temperature control logic as:

first, using a temperature sensor to obtain a temperature $T_{f,pv}$ when the feedwater enters the boiler (1), and comparing the temperature $T_{f,pv}$ with a preset temperature $T_{f,sp}$ for the feedwater to enter the boiler (1), so as to obtain a temperature deviation $\Delta T_1$; using the temperature sensor to obtain a temperature $T_{s,pv}$ when a working fluid of the first solar collector (14) enters the high-pressure bypass heat exchanger (12), and comparing the temperature $T_{s,pv}$ with a preset temperature $T_{s,sp}$ for the working fluid of the first solar collector (14) to enter the high-pressure bypass heat exchanger (12), so as to obtain a temperature deviation $\Delta T_2$; accumulating the two temperature deviations to obtain a total temperature deviation $\Delta T_h$:

$$\Delta T_h = \Delta T_1 + \Delta T_2;$$

calculating the total temperature deviation $\Delta T_h$ in the PID controller to obtain a direct control command $\Delta \Psi_h$ for the high-pressure bypass pump (13):

$$\Delta \Psi_h = f(\Delta T_h);$$

meanwhile, due to long solar collector piping and large thermal inertia, processing a primary frequency regulation fast command with feedforward correction for temperature control of each section; and using a control command $\Delta_{\mu h}$ for the feedwater bypass valve (11), which is obtained in the primary frequency regulation control logic of the high-pressure feedwater bypass regulation scheme, to generate a feedforward signal command $\Delta_{\varphi h}$ for the high-pressure bypass pump (13) through a function generator:

$$\Delta \varphi_h = f(\Delta \mu_h)$$

finally, superimposing the direct control command $\Delta_{\Psi h}$ and the feedforward signal command $\Delta_{\varphi h}$ on the high-pressure bypass pump (13) to generate a latest speed command $\sigma_{h,new}$ thereof:

$$\sigma_{h,new} = \sigma_{h,old} + \Delta \Psi_h + \Delta \varphi_h$$

wherein: $\sigma_{h,old}$ is an initial speed of the high-pressure bypass pump (13);

for the primary frequency regulation with the low-pressure condensate bypass regulation scheme, formulating the outlet water temperature control logic as: first, using the temperature sensor to obtain a temperature $T_{c,pv}$ when the condensate enters the deaerator (4), and comparing the temperature $T_{c,pv}$ with a preset temperature $T_{c,sp}$ for the condensate to enter the deaerator (4), so as to obtain a temperature deviation $\Delta T_3$; using the temperature sensor to obtain a temperature $T_{o,pv}$ when a working fluid of the second solar collector (18) enters the low-pressure bypass heat exchanger (16), and comparing the temperature $T_{o,pv}$ with a preset temperature $T_{o,sp}$ for the working fluid of the second solar collector (18) to enter the low-pressure bypass heat exchanger (16), so as to obtain a temperature deviation $\Delta T_4$; accumulating the two temperature deviations to obtain a total temperature deviation $\Delta T_d$:

$$\Delta T_d = \Delta T_3 + \Delta T_4;$$

calculating the total temperature deviation $\Delta T_d$ in the PID controller to obtain a direct control command $\Delta_{\Psi d}$ for the low-pressure bypass pump (17):

$$\Delta \Psi_d = f(\Delta T_d);$$

meanwhile, due to long solar collector piping and large thermal inertia, processing a primary frequency regulation fast command with feedforward correction for temperature control of each section; and using a control command $\Delta_{\mu d}$ for the condensate bypass valve (15), which is obtained in the primary frequency regulation control logic of the low-pressure condensate bypass regulation scheme, to generate a feedforward signal command $\Delta_{\varphi d}$ for the low-pressure bypass pump (17) through the function generator:

$$\Delta \varphi_d = f(\Delta \mu_d)$$

finally, superimposing the direct control command $\Delta_{\Psi d}$ and the feedforward signal command $\Delta_{\varphi d}$ on the low-pressure bypass pump (17) to generate a latest speed command $\sigma_{d,new}$ thereof:

$$\sigma_{d,new} = \sigma_{d,old} + \Delta \Psi_d + \Delta \varphi_d$$

wherein: $\sigma_{d,old}$ is an initial speed of the low-pressure bypass pump (17).

2. The solar aided coal-fired power generation system, as recited in claim 1, wherein the feedwater bypass valve (11) and the condensate bypass valve (15) are both steam-actuated regulating valves; in the high-pressure feedwater bypass regulation system, the first solar collector (14) is a medium temperature trough solar collector, and a heat-conducting working fluid is heat-conducting oil; in the low-pressure condensate bypass regulation system, the second solar collector (18) is a medium-low temperature flat plate solar collector, and a heat-conducting working fluid is heat-conducting oil or water.

3. The solar aided coal-fired power generation system, as recited in claim 1, wherein the high-pressure bypass pump (13) in the high-pressure feedwater bypass regulation system and the low-pressure bypass pump (17) in the low-pressure condensate bypass regulation system are both variable-speed pumps for controlling the temperatures when the feedwater enters the boiler (1) and the condensate enters the deaerator (4) in real time, thereby ensuring a minimal deviation between the temperature when the feedwater enters the boiler (1) and the preset temperature, as well as a minimal deviation between the temperature when the condensate enters the deaerator (4) and the preset temperature.

* * * * *